United States Patent

[11] 3,587,529

| [72] | Inventors | Lloyd C. Wienert<br>1117 Surrey Road, Millard, Nebr. 68046;<br>Lynn Fitzgerald, 7905 S. 37th, Omaha,<br>Nebr. 68147; Hiram A. Sturges, 5803<br>Nicholas, Omaha, Nebr. 68132; Henry T.<br>Johnson, 1817 S. 108th, Omaha, Nebr.<br>68144 |
|---|---|---|
| [21] | Appl. No. | 735,808 |
| [22] | Filed | June 10, 1968 |
| [45] | Patented | June 28, 1971 |

[54] LIVESTOCK FEEDER
4 Claims, 11 Drawing Figs.

[52] U.S. Cl. .................................................. 119/51.5,
119/52
[51] Int. Cl. ................................................... A01k 5/00
[50] Field of Search .......................................... 119/51;
119/51.5, 52, 51.11

[56] References Cited
UNITED STATES PATENTS

| 2,536,621 | 1/1951 | Arnold | 119/51 |
| 2,685,863 | 8/1954 | Martin | 119/51 |
| 2,786,448 | 3/1957 | McMaster | 119/52 |
| 3,087,461 | 4/1963 | Strand | 119/52 |
| 3,202,130 | 8/1965 | Sutton | 119/51.11 |
| 3,273,539 | 9/1966 | Cooper | 119/52 |

FOREIGN PATENTS

| 720,664 | 11/1965 | Canada | 119/52.2 |

Primary Examiner—Hugh R. Chamblee
Attorney—Henderson & Strom

ABSTRACT: A livestock feeder comprising a frame supporting a plurality of spaced animal compartments, a moving feed delivery unit passing by the compartments and delivering feed into feed containers disposed in each of the compartments, mounting means including wheel means for mounting said feed delivery unit on said frame and guiding its travel along a row of the feed containers, and means for automatically driving the delivery unit along the row.

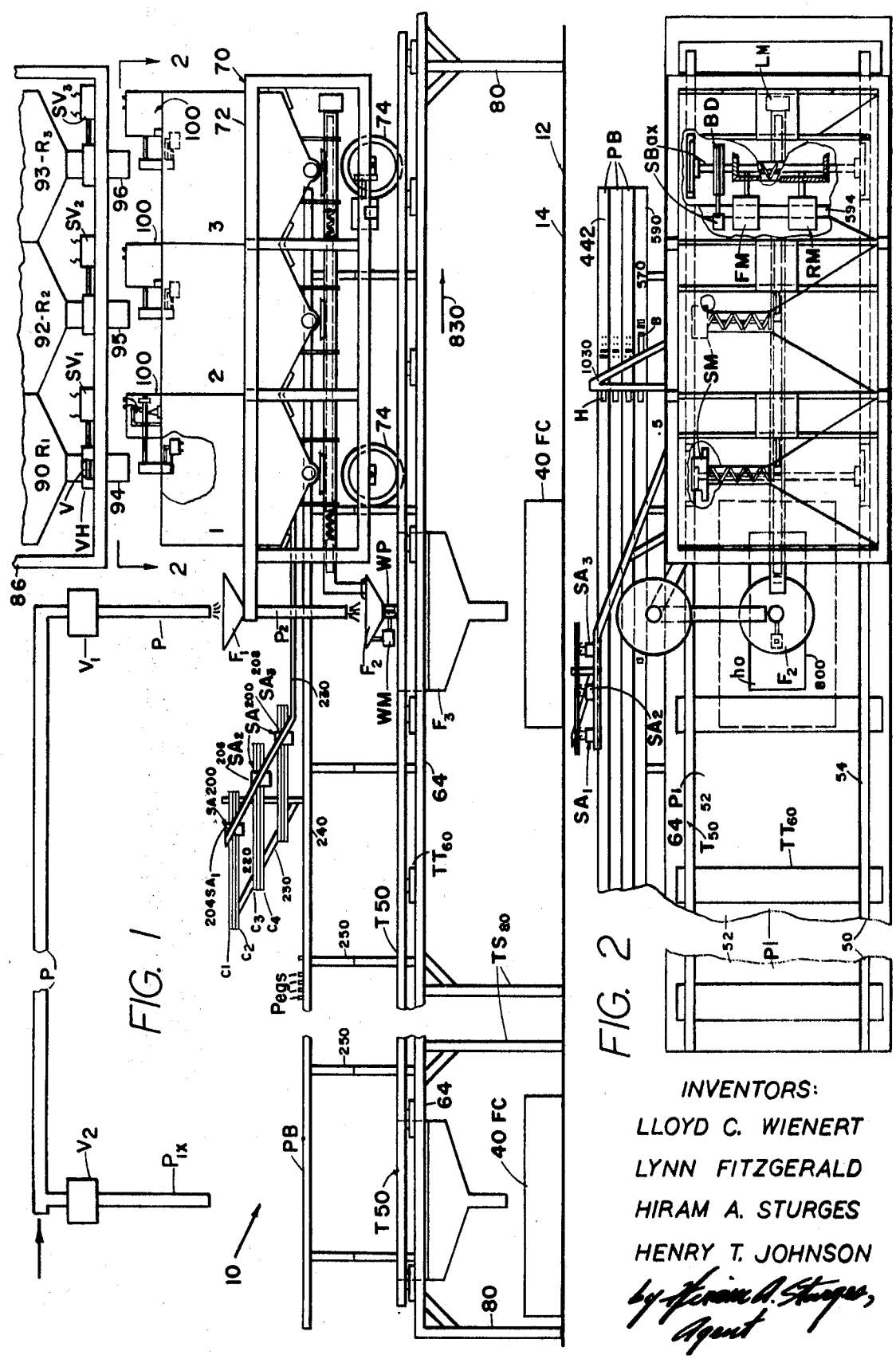

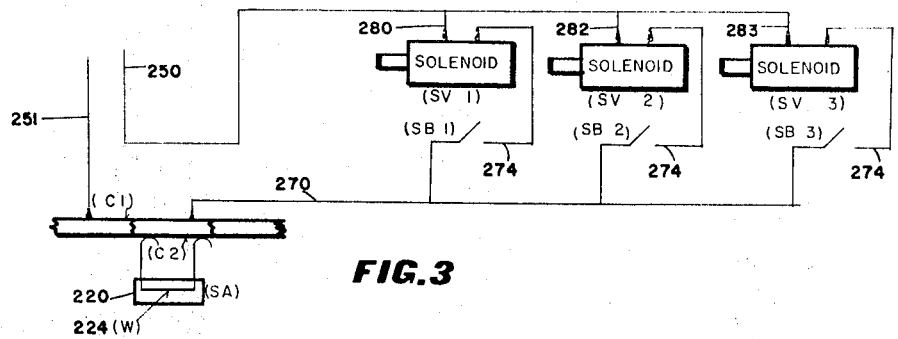
FIG.3
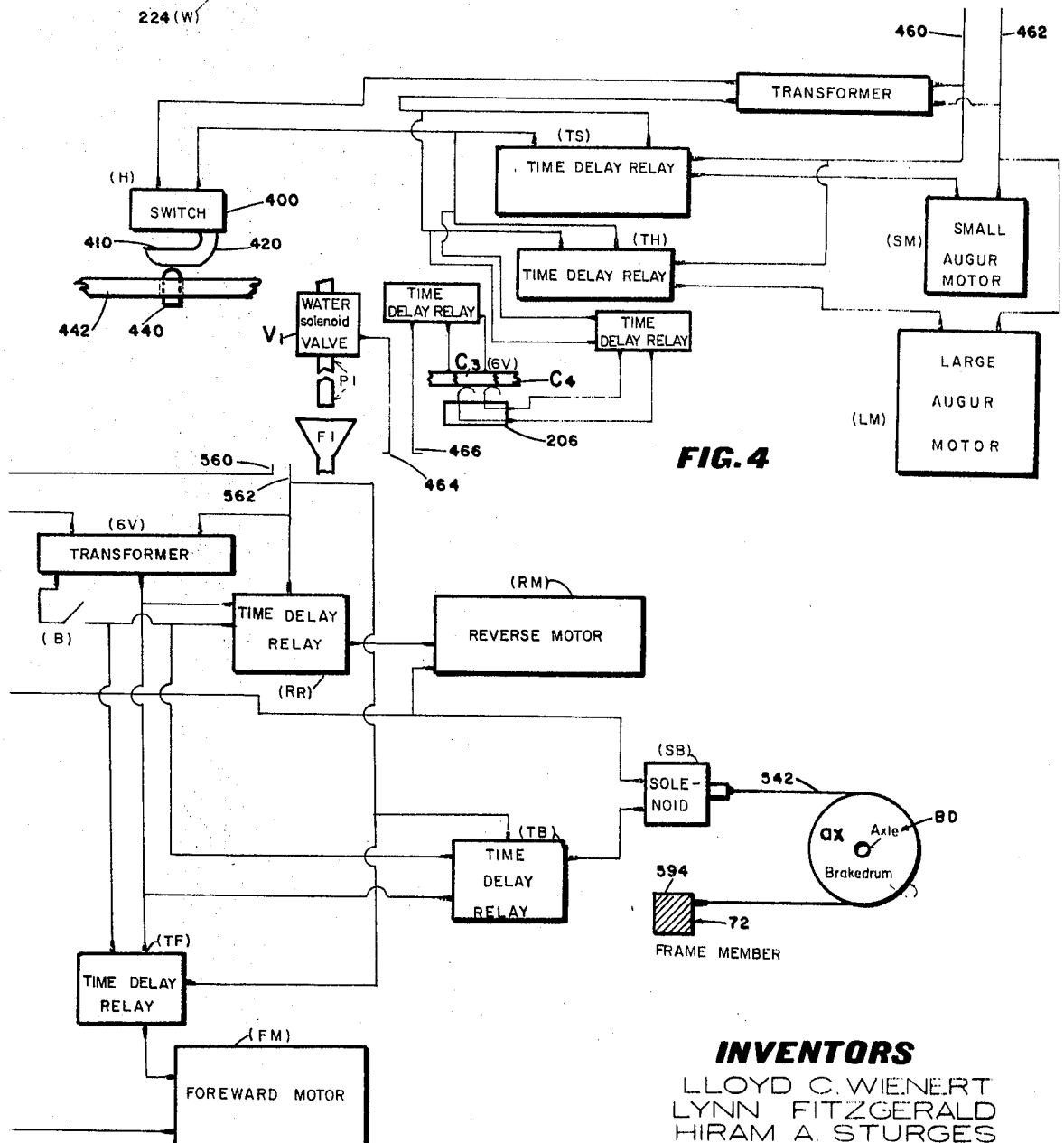
FIG.4
FIG.5
INVENTORS
LLOYD C. WIENERT
LYNN FITZGERALD
HIRAM A. STURGES
HENRY T. JOHNSON
BY *Hiram A. Sturges, Agent*

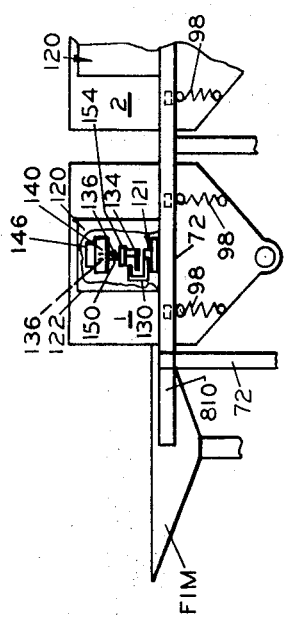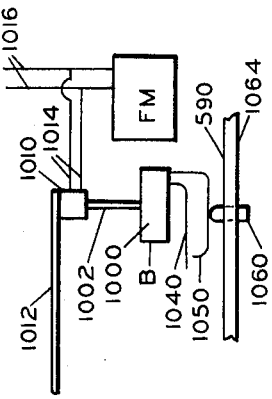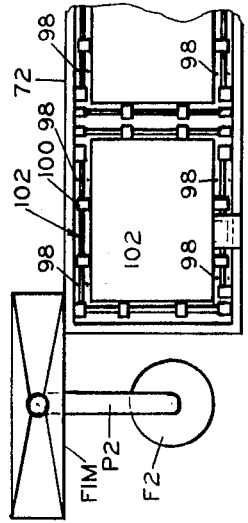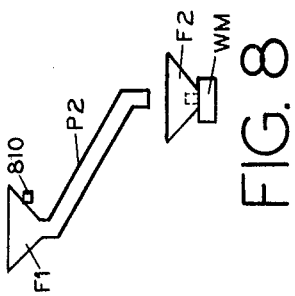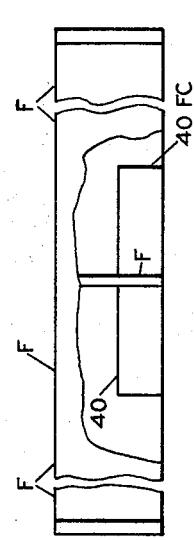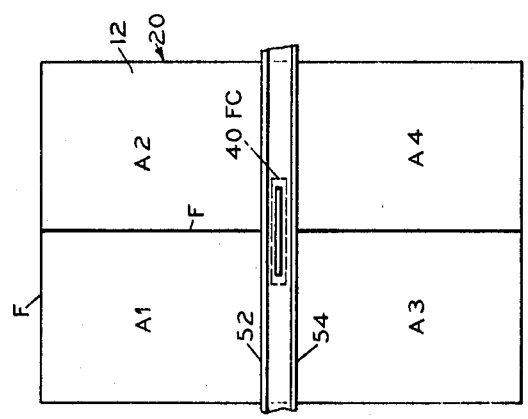

LIVESTOCK FEEDER

FIELD OF THE INVENTION

This invention is in the field of livestock feeders having means for automatically causing delivery of feed to spaced feed containers in spaced animal compartments.

DESCRIPTION OF THE PRIOR ART

Heretofore it had not been possible to deliver feed by automatic machine at selected points along the route of a feed delivery unit, the feed being of a selected mixture, the mixture being potentially different at each delivery point.

Heretofore there has not been available on the market an automatic machine adapted to mix water and dry feed and delivery the mixture at spaced delivery points along the route of a feed delivery unit which reciprocates back and forth along a straight track means.

SUMMARY OF THE INVENTION

A livestock feeder comprising a frame supporting a plurality of spaced animal compartments, a moving feed delivery unit passing by the compartments and delivering feed into feed containers disposed in each of the compartments, mounting means including wheel means for mounting said feed delivery unit on said frame and guiding its travel along a row of the feed containers, and means for automatically driving the delivery unit along the row, the delivery unit passing along a straight track first in a forward direction and then in a reverse direction, the delivery unit having a plurality of bins, each bin having a small auger in the underside of it, each small auger having an outlet, a large auger extending under the outlets from each of the smaller augers for delivering feed from each of said bins to a mixing means, means for delivering water from a point on said feed delivery unit to said mixing means, said straight track means comprising two parallel horizontal tracks, said compartments each having floor means, a plurality of feed containers disposed on in each compartment, the feed passing from said mixer to each of said feed containers as said mixer passes each feed container, peg bar means extending longitudinally of said track, peg-receiving openings in said peg bar means and longitudinally spaced with respect to each other, pegs in certain ones of said peg-receiving openings, switch means attached to said feed unit and actuatable by contact with said pegs as said unit passes by said pegs, motor means for said augers receiving a source of power at times when said switch means is closed due to actuation by contact with the peg for initiating the delivery of feed from said bin into said mixer, water-catching means mounted on said unit and adapted to deliver water to said mixer, water supply means mounted on said frame and having outlet means delivering water into said water-catching means at times when the latter is under a water outlet, means for electrically controlling the passage of water from said water supply means to said outlet selectively and only at times when said water-catching means is under an outlet adjacent a respective container, peg, and peg bar means adjacent a respective container and actuable by a switch mounted on said unit for initiating the flow of water from an outlet adjacent a container into said water catching means at times when the respective switch engages a respective water peg, means for automatically refilling said bins from multiple supply reservoirs containing dry feed only at times when operatively correlated electrical switch control means on said unit and on said frame create an electrical circuit for controlling said delivery means from said reservoir, each bin having independent means for automatically and electrically stopping the flow of feed into that bin before the feed might overflow that bin, such stopping means being the independent mounting of each bin on springs so as to move up and down in accordance with its weight, with the springs tending to resist downward movement of each bin independently, an electrical switch means adapted to open and thereby break a circuit to electrical means controlling flow from a reservoir delivering to that bin whenever that given bin has moved downwardly under the weight of feed therein sufficient to indicate a sufficient fullness of that bin, roller means between each bin and the remainder of said unit tending to position each bin for movement generally only upwardly and downwardly for cooperation with the switch means which indicates a full condition of that bin, the said feed containers being disposed partially each within an animal compartment, each feed container serving multiple animal compartments, compartmenting wall means defining said compartments and permitting access to a given feed container from a plurality of separate animal compartments while preventing animals from moving from one of said compartments to the other.

A forward drive motor and a rearward drive motor each in driving connection with the wheels of said unit which latter engage said tracks, changeover switch means on said unit and engaging at times changeover switch pegs on a changeover switch peg bar means adjacent an end of said track and means electrically interconnecting said motors and a source of power and said changeover switch causing the forward drive motor to receive power at times and for causing the rearward drive motor to receive power at alternate times for causing said delivery unit to move back and forth along said track.

BRIEF DESCRIPTION OF THE DRAWING

FIG. 1 is a side elevation of the livestock feeder of this invention with parts broken away for convenience of illustration.

FIG. 2 is a top plan view of the livestock feeder of FIG. 1, but with a left-hand end portion thereof broken away and not shown, other parts of the feeder being broken away for purposes of illustration.

FIG. 3 is a wiring diagram showing the method of control of the reservoir valve solenoids for controlling the flow of feed from reservoirs into bins.

FIG. 4 is a wiring diagram showing the automatic control of auger motors and water valve.

FIG. 5 is a wiring diagram showing the automatic control of forward and reverse drive motors of a feed delivery unit of the feeder and also the automatic control of a brake assembly thereof.

FIG. 6 shows a detail of the delivery unit showing the method of mounting of bins and switch mechanisms for the control of the resupply of the bins.

FIG. 7 is a top plan view of the parts of FIG. 6, but with the switch parts enclosed by their housing.

FIG. 8 is a detail of the water delivery system as it would be seen looking at FIG. 1 from the left-hand end thereof.

FIG. 9 is a top plan view of a multiple compartment assembly with which a single feed container is shared by each of a plurality of compartments, track and catwalk means of the delivery unit of FIG. 1 being shown extending thereover.

FIG. 10 is a view of FIG. 9 as it would be seen from one side with compartment walls partially broken away and showing the feed container or feed trough which is shared by the multiple compartments.

FIG. 11 shows a changeover switch wiring diagram for control of the drive wheels of the delivery unit.

Referring to FIG. 1, the livestock feeder unit of this invention is there generally indicated at 10 and comprises a frame generally indicated at 12 which can, as one of its parts, have a floor 14 which can either be the surface of the ground or the surface of a concrete area extending horizontally and supporting thereon a plurality of spaced animal compartment assemblies generally indicated at 20 in FIG. 9 and best understood with respect to FIG. 1 by observing that in FIGS. 9 and 10 a feed container 40FC is shown, and the latter is preferably a trough having an open top rested upon the floor 12. The feed containers are spaced along a track assembly T50, which latter is composed of two tracks 52 and 54 disposed in spaced apart horizontal parallelism mounted on track ties TT60 carried by a track-supporting platform 64P1, the upper side of which forms an elongated horizontal catwalk for workers and which is itself supported by track-supporting post means TS80 supported by the ground 14 for forming a part of what has been called the frame 12.

A moving feed delivery unit is generally indicated at 70 and has a unit frame 72 on which wheels 74 are mounted for traveling along the tracks 50.

It will be seen that time pressures have caused this application to be informal requiring later formalizing, and so with earlier used letters numbers shall now be placed on many of the parts, and some of the description shall use numbers and other parts of the description shall use letters only, each referring to the same part.

Referring to FIG. 1, a reservoir frame 86 is there shown having a vertical support portion 88 supporting it from connection to platform 64PL and on the frame 86 are mounted a plurality of reservoirs 90R1, 92R2, and 93R3, each having an outlet 94, 95, and 96, respectively, spaced apart longitudinally of the track 50 so that at times each can be above a respective dry feed bin 1, 2, and 3, respectively, when the unit 70 is disposed beneath the reservoirs.

The reservoirs 1, 2, and 3 are spaced along the frame 72 of the unit 70 in alignment with the tracks 50.

Bin-refilling control switch assemblies 100 are shown disposed one above each bin, but as the assemblies 100 are obsolete, they are not further described, as there purpose is better served by means shown in FIGS. 6 and 7.

Referring to FIG. 6, a sample bin is there shown being the bin 1 and is seen to be suspended in the frame 72 by means of four springs 98, each connected at its upper end to the frame 72 and each extending downwardly to a point of connection with the bin 1, two of the springs 98 being on one side of a bin and two on the other side of a bin, whereby the spring assemblies 98 tend to give the bins complete support so that it can move upwardly and downwardly with respect to the frame 72.

Upward and downward movements of each bin are further facilitated by the fact that all four sides of the bin are engaged by the roller assemblies 102, which latter are mounted on the frame 72 so that all four sides of each bin are engaged by rollers sufficiently closely as to permit the bins to move only vertically with respect to the frame 72 while suspended in the position shown by the springs 98.

Referring again to FIG. 6, a switch assembly 120 is shown, one at each found a switch 121SB1, as seen in FIG. 6, the assemblies 120 of the bins 2 and 3 each having a similar switch 122SB2 and 123SB3, respectively, the latter two switches shown only in FIG. 3.

The switch 121SB1 has a stationary contact 130 insulated from and mounted on the frame 72 and has a moving contact 134 insulated from and mounted on a carrier shaft 136 which extends slidably through a mounting 140 which latter is mounted on and moves with a side of the bin 1.

An upper end of the shaft 136 has a stop 146 on it for holding the shaft 136 within the member 140. The shaft 136 can move up and down being moved downwardly, however, by a spring 150 disposed between the member 140 and an insulating member 154 which reason, it will be seen that the switch 121 is normally closed with the contacts 134 contact 134 to the shaft 136.

As thus described, it will be seen that when a bin 1 is full to a desired extent, a flow of feed from the reservoir 90 into the bin 1 will stop if flow control means is caused to stop whenever the switch 121 is open, and for this reason, it will be seen that the switch 121 is normally closed with the contacts 134 contacting the underside of the contact 130 and only moving downwardly away from the contact 130 at a time when the bin moves downwardly because it is quite full against the urge of the spring 98.

In FIG. 1, the switch assembly generally designated SA200 is shown having switches 204SA1, 206SA2, and 208SA3, each disposed one below the other and each having a moving section 220, best seen in FIG. 3 but seen in FIG. 1 to be mounted on a switch bracket 230 directly connected to the frame 72 of the delivery unit so that the moving switch portions 220 move with the delivery unit, each moving switch portion has a wire 224 W fixed thereto having two ends disposed one above and one below each other for engaging different ones of a pair of contact bars C1 and C2, which latter are disposed above and below each other on a contact bar frame 230, best seen in FIG. 1, and which latter is mounted on a peg bar support frame 240, which latter is itself mounted on the platform 64 by means of posts 250, whereby the bars C1 and C2 are held stationary and are positioned so as to be engaged by the wire 224 only at times when the bins 1, 2, and 3 are under the outlets 94, 95, and 96. The effect of the wire 224 is to cause the contact bars C1 and C2 to be in electrical communication for carrying current from a power source represented by a pair of wires 250 and 251 onward, the wire 251 being connected to the bars C1, C2 being connected by wire 270 to each of three switches SB1, SB2, and SB3, the other contact of each switch being connected by a wire 274 to a contact of a respective solenoid SV1, SV2, and SV3.

The other terminal of each solenoid is connected by a wire 280, 282, and 283 to the wire 250.

In FIG. 2 a switch H is shown having a stationary portion 400 having two resilient contacts which are pressed toward each other for making contact only at times when the lower one of the contacts 420 is engaged by the peg 440 in a peg bar 442, which latter is mounted on the stationary support 240 carried by post 250. The peg 440 is so placed as to cause the switch H to close only when it is the position of the bins to be under the outlets.

In FIG. 4, power wires 460 and 462 are provided and other power wires 464 and 466 are also provided, and the valve VI represents the place in the circuit of the valve V2, also. Also in Fig. 4, the switch 206 is shown and it has a similar construction to the switch 220 and operates on contact bars C3 and C4 of stationary nature.

In FIG. 5, power comes through power wires 560 and 562 and a Switch B in FIG. 5, the Switch B seen in FIG. 2, is in control and it has a portion moving with and fixed to the frame 72 and another portion which is the inactuating peg disposed beneath the main part of the switch B, since the switch B is constructed like the switch H, whereby the peg on the peg board 590 and disposed under the switch B in FIG. 2 causes the switch B to close.

In FIG. 5, a solenoid SV, when actuated, pulls on a belt anchored to a frame member 594 of the frame 72.

In FIGS. 6 and 7, the funnel FI of FIGS. 1 and 2 has been modified so as to be much longer, and it is, therefore, in FIGS. 6 and 7 given the letter FIM to stand for FI modified. It is much longer then so as to be still more effective in receiving water during a period while the unit 70 is in motion and are as long as the funnel F3 and the opening 800 through the platform which is above each feed container or trough 40. In FIG. 8, funnel FI is seen supported on a bracket 810 fixed to frame 72 in FIG. 6.

In FIG. 5, when switch B closes as the unit is going in reverse in the direction of the arrow 830 of FIG. 1, then the reverse motor RM is shut off by RR; after that the brake solenoid SV is powered by TV to set the brake by tightening the belt 592. Next, TF starts the forward motor FM to take the carriage or unit 70 in a forward direction.

TF keeps the forward motor running until the unit 70 is on its return trip again in the direction of the arrow 830, and only then does the forward motor FM shut off from a closing of the switch B. An alternative would be to have a fixed switch at each end of the track operated by engagement with means on the moving unit 70 causing the forward motor to be turned on at the right end of the track and the reverse motor to be turned off and causing the reverse motor to be turned on at the left end of the track and the forward motor to be turned off.

In FIG. 11, the switch B which is constructed in the manner of the switch H of FIG. 4 has its stationary portion 1000 actually movable up and down because it is fixed to the shaft 1002 of a solenoid 1010 carried by a rod 1012 supported by a bar 1012 which can be seen in FIG. 2 to be disposed above the switch B and the bar 1012 is supported on a bracket 1030 mounted on the frame 72.

In operation, when the solenoid 1010 receives power (which is at the same time the forward motor FM receives power since it is powered by wires 1014 connected to the terminal wires 1016 of the forward motor FM) so the solenoid is actuated only when the forward motor is on, thereby lifting the stationary part 1000 pulling the contact 1040 and 1050 of the switch B away from a peg 1060 in a peg bar 1064 which is disposed directly beneath the switch B and which can also be number 590 to be more consistent with FIG. 2.

We claim:

1. A livestock feeder adapted to deliver feed to animals, the livestock feeder comprising: a frame having a forward end and a rear end, a plurality of spaced animal compartments supported in at least one horizontal row by said frame, a plurality of spaced feed containers arranged in a row with each disposed relative to said animal compartments wherein the animals contained in each animal compartment can feed from one of said feed containers, a feed delivery unit movably mounted on said frame, power means connected to said feed delivery unit for continuously moving said feed delivery unit along said frame, switch means mounted at each end of said frame for reversing the direction of movement of said feed delivery unit wherein said feed delivery unit moves along said frame in a forward direction and then in a reverse direction, peg means disposed along said frame relative to said feed containers, said feed delivery unit operable in response to contact thereof by said peg means to deliver a predetermined amount of feed to each of said feed containers, said feed delivery unit comprises a plurality of bins, a small auger disposed relative to each said bin for carrying feed therefrom, a larger auger disposed under the outlet ends of each small auger for carrying feed therefrom, and a mixing unit disposed under the outlet end of said large auger, said mixing unit adapted to mix the feed received from said large auger and to deposit the feed in said feed containers in response to the operation of said peg means.

2. A livestock feeder as defined in claim 1 wherein said feed delivery unit further comprises a water supply means fluidly connected to said mixing unit for supplying water thereto at predetermined times.

3. A livestock feeder as defined in claim 2 including a plurality of reservoirs disposed adjacent said frame, each said reservoir adapted to supply feed to one of said bins at predetermined times, switch means operably interconnecting said feed delivery unit and said reservoirs, said switch means operable to stop the motion of the said feed delivery unit on said frame and to cause feed to flow from each said reservoir into its respective said bin and to again start said feed delivery unit into motion after feed is delivered from said reservoirs to said bins.

4. A livestock feeder as defined in claim 3 wherein each said bin is spring connected to said frame and adapted to move only vertically in response to the weight of feed therein, said switch means further operatively connected to each said bin wherein when said bin has a predetermined amount of feed therein said switch means is operable to stop the flow of feed thereto.

UNITED STATES PATENT OFFICE
CERTIFICATE OF CORRECTION

Patent No. 3,587,529      Dated June 28, 1971

Inventor(s) Lloyd C. Wienert, et. al.

It is certified that error appears in the above-identified patent and that said Letters Patent are hereby corrected as shown below:

On the cover sheet, insert -- [73] Assignee Wilson & Co., Inc., Chicago, Ill., a corp. of Del. -- .

Signed and sealed this 19th day of December 1972.

(SEAL)
Attest:

EDWARD M. FLETCHER, JR.
Attesting Officer

ROBERT GOTTSCHALK
Commissioner of Patents